United States Patent
Kienzle et al.

(10) Patent No.: US 8,963,768 B2
(45) Date of Patent: Feb. 24, 2015

(54) MEASUREMENT SYSTEM COMPRISING A PRESSURE RESISTANT FEED-THROUGH

(75) Inventors: Klaus Kienzle, Zell am Harmersbach (DE); Juergen Motzer, Gengenbach (DE); Juergen Dietmeier, Hausach (DE)

(73) Assignee: Vega Grieshaber KG, Wolfach (DE)

( * ) Notice: Subject to any disclaimer, the term of this patent is extended or adjusted under 35 U.S.C. 154(b) by 428 days.

(21) Appl. No.: 13/466,709

(22) Filed: May 8, 2012

(65) Prior Publication Data

US 2013/0127654 A1    May 23, 2013

Related U.S. Application Data

(60) Provisional application No. 61/490,164, filed on May 26, 2011.

(30) Foreign Application Priority Data

May 26, 2011  (EP) .................................. 11 167 753

(51) Int. Cl.
  *G01S 13/08* (2006.01)
  *G01F 23/284* (2006.01)
  *H01Q 1/22* (2006.01)

(52) U.S. Cl.
  CPC .............. *G01F 23/284* (2013.01); *H01Q 1/225* (2013.01)
  USPC .......... 342/124; 342/118; 73/290 R; 73/866.5

(58) Field of Classification Search
  CPC .............................. G01F 23/284; H01Q 1/225
  USPC ......................................... 342/124; 73/290 R
  See application file for complete search history.

(56) References Cited

U.S. PATENT DOCUMENTS

| | | | |
|---|---|---|---|
| 6,247,362 B1 * | 6/2001 | Soroka .......................... | 73/290 V |
| 6,750,657 B2 * | 6/2004 | Griessbaum et al. .......... | 324/642 |
| 7,392,699 B2 * | 7/2008 | Motzer et al. ................ | 73/290 R |
| 7,401,511 B2 * | 7/2008 | Dietmeier .................... | 73/290 R |
| 7,698,940 B2 * | 4/2010 | Osswald et al. ............. | 73/304 C |
| 8,279,130 B2 * | 10/2012 | Dietmeier .................... | 343/786 |
| 2002/0121907 A1 | 9/2002 | Griessbaum et al. | |
| 2008/0134778 A1 * | 6/2008 | Osswald et al. ................ | 73/304 |
| 2008/0303710 A1 * | 12/2008 | Kienzle et al. ................. | 342/124 |
| 2010/0141505 A1 * | 6/2010 | Bergmann et al. ............ | 342/124 |

FOREIGN PATENT DOCUMENTS

| | | |
|---|---|---|
| EP | 1 083 414 | 3/2001 |
| WO | 2010/105654 | 9/2010 |

* cited by examiner

*Primary Examiner* — John B Sotomayor
*Assistant Examiner* — Marcus Windrich
(74) *Attorney, Agent, or Firm* — Fay Kaplun & Marcin, LLP

(57) ABSTRACT

Stated is a process separation device for a fill-level measuring device including a pressure resistant feed-through for an inner conductor. The process separation device comprises an inner conductor, an outer conductor, a process side, a control side, and a feed-through. The inner conductor comprises a first conical region, and/or the outer conductor comprises a second conical region. The feed-through comprises the first conical region and/or is encompassed by the second conical region, and in this manner establishes a connection having positive fit between the inner conductor and the outer conductor.

9 Claims, 3 Drawing Sheets

MEASUREMENT SYSTEM COMPRISING A PRESSURE RESISTANT FEED-THROUGH

REFERENCE TO RELATED APPLICATIONS

This application claims the benefit of the filing date of EP Patent Application Serial No. EP 11 167 753.0 filed 26 May 2011 and U.S. Provisional Patent Application Ser. No. 61/490,164 filed 26 May 2011, the disclosures of both applications are hereby incorporated by reference.

FIELD OF THE INVENTION

The invention relates to a high-pressure-resistant seal in the field of fill level measuring. In particular, the invention relates to a process separation device for a fill-level measuring device comprising a pressure resistant feed-through for an inner conductor, to a coupling for a fill-level measuring device for coupling a process side to a control side, and to a fill-level measuring device with a coupling.

BACKGROUND

Process separation devices are used in measuring devices in order to separate a process side from a control side. On the process side, usually, measuring of a physical quantity takes place, wherein on the process side a suitable sensor for measuring the physical quantity to be measured is arranged. On the control side, usually, a control circuit or an evaluation circuit is allocated, as is the energy supply for the sensor that is arranged on the process side.

Depending on the physical quantity to be measured on the process side, it may be necessary for the process side to be suitably separated from the control side, for example by pressure-tight separation, for example if the process side is pressurized when compared to the control side.

U.S. Pat. No. 6,247,362 B1 shows a high-pressure process separation device comprising an inner conductor, an outer conductor and a pressure seal between the inner conductor and the outer conductor. The pressure seal comprises an elongated cylindrical shape and correspondingly the outer conductor comprises a cylindrical internal opening in a direction along the longitudinal axis in order to receive the cylindrical pressure seal in such a manner that a characteristic electrical impedance of the process separation device does not change.

In this arrangement, separation of a process side from a control side takes place in that the pressure seal enters a connection, actuated by adherence, with the inner conductor and the outer conductor.

SUMMARY OF THE INVENTION

The present invention relates to a process separation device comprising an alternative pressure seal without the need to influence the characteristic electrical impedance of the process separation device.

Stated are a process separation device for a fill-level measuring device comprising a pressure resistant feed-through, a coupling for a fill-level measuring device, and a fill-level measuring device according to the characteristics of the independent claims. Developments of the invention are stated in the subordinate claims and in the following description.

According to a first aspect of the invention, a process separation device for a fill-level measuring device comprising a pressure resistant feed-through for an inner conductor is stated, which process separation device comprises an inner conductor, an outer conductor, a process side, a control side, and a feed-through. In this arrangement a longitudinal axis of the process separation device extends from the process side to the control side. The inner conductor comprises a first conical region and/or the outer conductor comprises a second conical region. The first conical region and the second conical region taper off in a direction along the longitudinal axis of the process separation device. In this arrangement the feed-through comprises the first conical region and/or is encompassed by the second conical region in order to, in this manner, establish a connection having positive fit between the inner conductor and the outer conductor.

The inner conductor and the outer conductor are suitable to transmit an energy supply and control signals from the control side to the process side, and to transmit electrical signals, which correspond to a measuring value acquired by a sensor, from the process side to the control side.

The feed-through is suitable to effect separation between the control side and the process side, in particular to counteract a pressure differential between the control side and the process side. Furthermore, the feed-through is suitable to electrically insulate the inner conductor and the outer conductor from each other.

The feed-through may comprise materials that are suitable to cause electrical insulation, and to counteract a predetermined pressure differential between the process side and the control side. In particular, these materials can be synthetic materials, glass or composite materials. For example, the feed-through is a pressure-resistant glass feed-through.

The feed-through interacts with the first conical region and/or the second conical region in such a manner that a connection having positive fit is established between the inner conductor, the feed-through and the outer conductor.

This connection having positive fit may improve the pressure resistance of the feed-through.

A process separation device as described above and below may comprise a first conical region on the inner conductor, or a second conical region on the outer conductor, or a first conical region on the inner conductor and a second conical region on the outer conductor.

The first conical region and the second conical region may, in particular, be designed in such a manner that they taper off in the same direction along the longitudinal axis of the process separation device. For example, the first conical region and the second conical region taper off in a direction from the process side to the control side along the longitudinal axis of the process separation device.

However, the first conical region and the second conical region may also taper off in the opposite direction along the longitudinal axis of the process separation device. For example, the first conical region can taper off in a direction from the control side to the process side, and the second conical region can taper off in a direction from the process side to the control side. This design is able to produce an improved connection having positive fit between the outer conductor, the feed-through and the inner conductor.

Of course, a reversal of the respective direction of tapering off of the first conical region and of the second conical region may be possible.

The angle of taper of the first conical region and the angle of taper of the second conical region can be set in such a manner that the characteristic electrical impedance of the process separation device remains the same or almost the same over the conical region. In particular, the characteristic impedance in the entire process separation device can be 50 Ohm throughout. However, the characteristic impedance of the process separation device can also comprise a deviation of up to 10% downwards or upwards.

An unchanging or almost unchanging characteristic electrical impedance over the entire course of the process separation device can, in particular, be of importance in the case of measuring devices that are based on the principle of time domain reflectometry, TDR, because the measuring accuracy of these measuring devices depends significantly on the signal transmission characteristics of the entire measuring device.

According to one embodiment of the invention, an angle of taper α of the first conical region is smaller than an angle of taper β of the second conical region.

The changes on the inner conductor as a result of the angle of taper α of the first conical region may have a greater influence on the characteristic electrical impedance of the process separation device than is the case with the changes on the outer conductor as a result of the angle of taper β of the second conical region.

According to a further embodiment of the invention, the angle of taper α is 1°, and the angle of taper β is 3°.

The angle of taper α and the angle of taper β may, of course, also comprise angular dimensions that are different from those mentioned above. For example, the angle of taper α can be up to 5°, and the angle of taper β up to 8°. In this arrangement, the angles of taper can be selected in such a manner that the characteristic impedance of the process separation device remains identical or almost identical.

According to a further embodiment of the invention, the outer conductor of the process separation device comprises a cylindrical region. In this arrangement the cylindrical region in a direction along the longitudinal axis of the process separation device can adjoin the second conical region and can comprise a smaller internal diameter than the second conical region. As a result of the smaller internal diameter of the cylindrical region when compared to the second conical region, a face area that extends in radial direction of the process separation device is generated, which face area establishes a connection having positive fit with the feed-through in such a manner that movement of the feed-through in a direction along the longitudinal axis of the process separation device from the process side to the control side is prevented.

In other words, the face area is a step between the cylindrical region and the second conical region, which step is situated on an inside of the outer conductor. In a direction along the longitudinal axis of the process separation device there is the face area between the feed-through and the control side, i.e., in such a manner that the feed-through in a direction from the control side to the process side is pushed against the face area, and thus a connection having positive fit is established. As a result of this the pressure resistance and the tightness of the process separation device can be further improved.

According to a further embodiment of the invention, the process separation device further comprises a filler material that has been placed in a space that is delimited by the inner conductor, the outer conductor and the feed-through.

The filler material may be suitable to compensate for any change in the characteristic electrical impedance of the process separation device as a result of the smaller internal diameter of the cylindrical region when compared to the internal diameter of the second conical region in such a manner that the characteristic impedance of the process separation device does not change, i.e. remains the same or almost the same across the entire course of the process separation device.

In particular, the filler may be a material with a smaller dielectric constant than the dielectric constant of the feed-through.

The dielectric constant of a glass feed-through can, for example, be 4.9 $AsV^{-1} m^{-1}$. For example, polyphenylene sulfide with a glass fiber content of 40% (PPS GF 40) with a dielectric constant of approximately 3.7 $AsV^{-1} m^{-1}$ can be used.

As a result of the different dielectric constants of the feed-through and of the filler, despite the irregular interior surface of the outer conductor a constant characteristic impedance over the entire process separation device can be achieved.

According to a further aspect of the invention, a coupling for a fill-level measuring device for coupling a process side to a control side is stated.

The coupling comprises a process separation device as described above and below, as well as a process connection and a control connection.

In this arrangement the process connection can be adapted to the conditions of the measuring environment. For example, the process connection may be a coupling element that can be coupled to a pressurized container.

To this effect, the process connection may, for example, comprise a flange or a thread.

The control connection may make it possible to connect an energy supply, an evaluation unit and a control unit to the coupling.

The coupling as described above and below may, in particular, advantageously be used in the case of applications using ammonia or halogenated hydrocarbons, for example Freon.

According to one embodiment of the invention, the process separation device is connected in a modular manner with the process connection and the control connection.

The modular connection of the control connection, process separation device and process connection requires a determined and unchanging coupling mechanism, on the one hand between the control connection and the process separation device, and on the other hand between the process separation device and the process connection.

Advantageously, the modularity of the elements of the coupling makes it possible to utilize the same process separation devices with varying control connections and process connections, so that in the case of a change in the measuring environment or in the control unit that is connected to the control connection, an unchanging process separation device can be used.

According to a further aspect of the invention, a fill-level measuring device with a coupling as described above and below is stated.

According to one embodiment of the invention, the fill-level measuring device is a time domain reflectometry (TDR) measuring device.

According to a further embodiment of the invention, the fill-level measuring device is a fill level radar.

Below, exemplary embodiments of the invention are described with reference to the figures.

DETAILED DESCRIPTION

Figure 1:
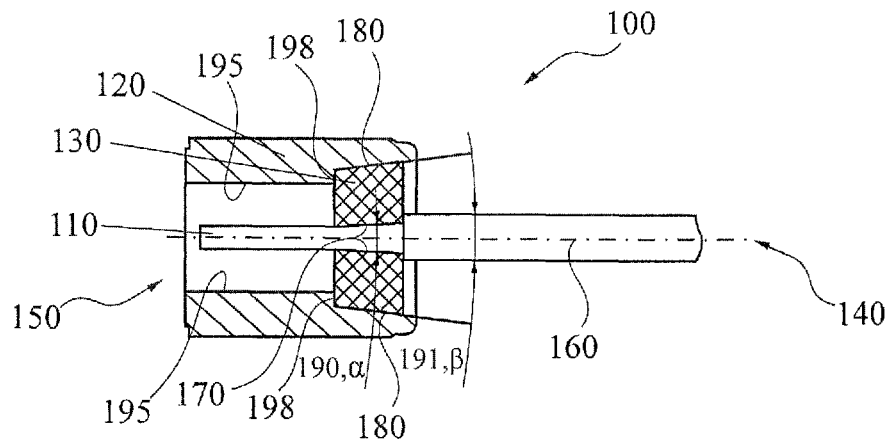
FIG. 1 shows a process separation device according to an exemplary embodiment of the present invention.

The illustrations in the figures are diagrammatic and not to scale.

If in the following description of the figures the same reference characters are used, they refer to identical or similar elements.

FIG. 1 shows a process separation device 100 according to an exemplary embodiment of the invention. The process separation device 100 comprises an inner conductor 110, an outer conductor 120 and a feed-through 130. A longitudinal axis 160 of the process separation device extends from the process side 140 to the control side 150.

The inner conductor 110 comprises a first conical region 170, and the outer conductor 120 comprises a second conical region 180.

Furthermore, the outer conductor 120 comprises a cylindrical region 195. In this arrangement the cylindrical region 195 comprises a smaller internal diameter than the second conical region 180. Consequently, on the cylindrical region a face area 198 arises, against which the feed-through 130 rests. The face area 198 may be by a ring-like flat surface arranged perpendicular to the longitudinal axis 160, thus forming a step between the cylindrical region 195 and the second conical region 180, against which step the feed-through 130 abuts. This step prevents the feed-through 130 to be pushed in the direction to the control side 150.

The first conical region 170 comprises an angle of taper α 190, and the second conical region 180 comprises an angle of taper β 191. The first conical region 170 and the second conical region 180 taper off in a direction along the longitudinal axis 160 from the process side 140 to the control side 150.

The feed-through 130 establishes a connection having positive fit between the inner conductor 110 and the outer conductor 120 by way of the first conical region 170, the second conical region 180 and the face area 198 so that the feed-through 130 cannot be pushed in a direction from the process side 140 to the control side 150.

The angle of taper α, the angle of taper β, and the extent of the face area 198 can be varied depending on the pressure resistance of the feed-through, which pressure resistance is to be achieved. For example, the above can be designed in such a manner that on the process side a pressure of 100 to 160 bar can be present.

Figure 2:
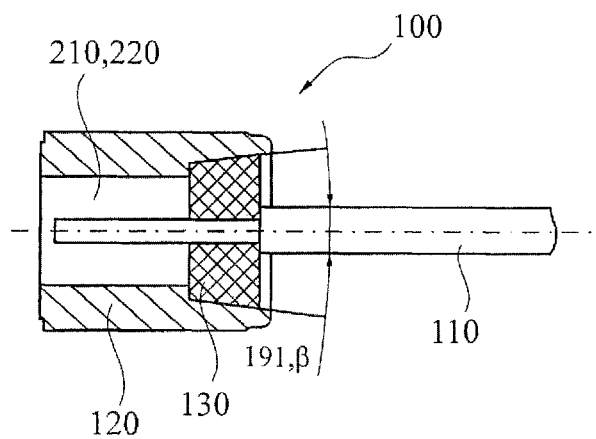
FIG. 2 shows a process separation device according to a further exemplary embodiment of the present invention.

FIG. 2 shows a process separation device 100 according to a further exemplary embodiment of the invention with an inner conductor 110 and an outer conductor 120 with a feed-through 130.

Over its course along the longitudinal axis of the process separation device the inner conductor 110 comprises a cylindrical shape. The outer conductor 120 comprises a second conical region with an angle of taper β 191.

Furthermore, FIG. 2 shows the space 220 delimited by the outer conductor, the inner conductor, and the feed-through. The space 220 can comprise a filler 210.

Figure 3:
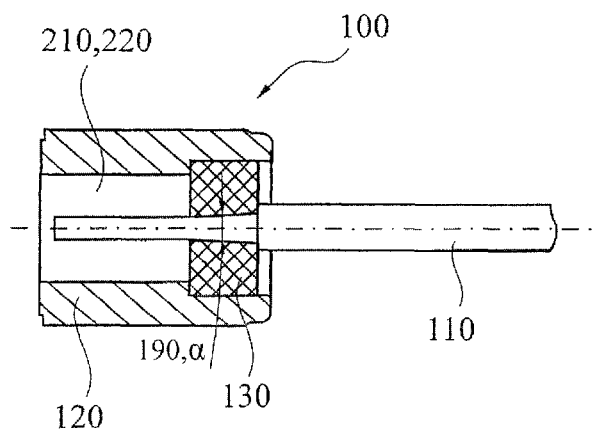
FIG. 3 shows a process separation device according to a further exemplary embodiment of the present invention.

FIG. 3 shows a process separation device 100 according to a further exemplary embodiment of the invention. The process separation device comprises an inner conductor 110, an outer conductor 120 and a feed-through 130.

In contrast to FIG. 2, FIG. 3 shows a first conical region on the inner conductor 110 with an angle of taper α 190. In this arrangement the first conical region tapers off from the process side 140 to the control side 150. As described above and below, the first conical region can, however, also taper off in a direction from the control side to the process side.

The outer conductor shown in FIG. 2 does not comprise a conical region.

The exemplary embodiments shown in FIG. 1, FIG. 2 and FIG. 3 each show a feed-through 130 that establishes a connection having positive fit between the inner conductor 110 and the outer conductor 120.

Figure 4:
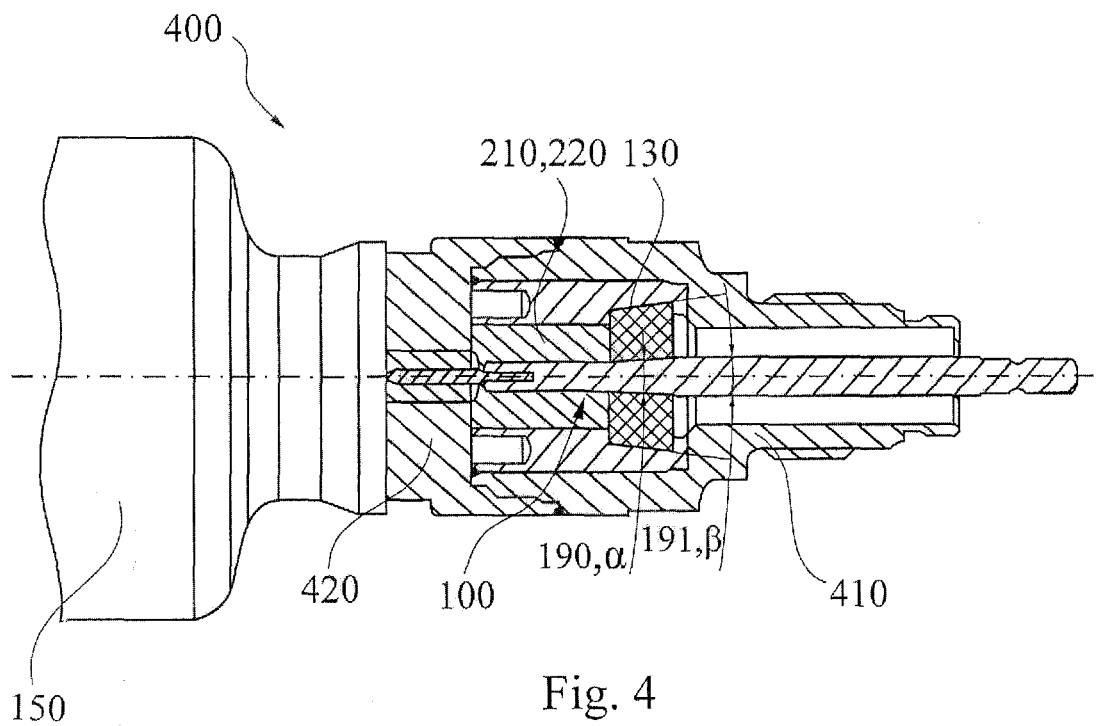
FIG. 4 shows a coupling according to an exemplary embodiment of the present invention.

FIG. 4 shows a coupling 400 according to an exemplary embodiment of the invention.

The coupling 400 comprises a process separation device 100, a process connection 410, and a control connection 420 as described above and below, wherein a control unit (not shown) is coupled to the control side 150.

In particular, the control connection 420 can be designed to close off the space 220 comprising the filler 210 together with the process separation device as described above and below.

The process connection 410 can be connected, in particular in a pressure-tight manner, to the measuring environment, for example to a container, by way of a thread, a flange, or in some other manner, taking into account the conditions of the measuring environment.

The control connection 420 is designed to connect the coupling to a control unit.

Figure 5:
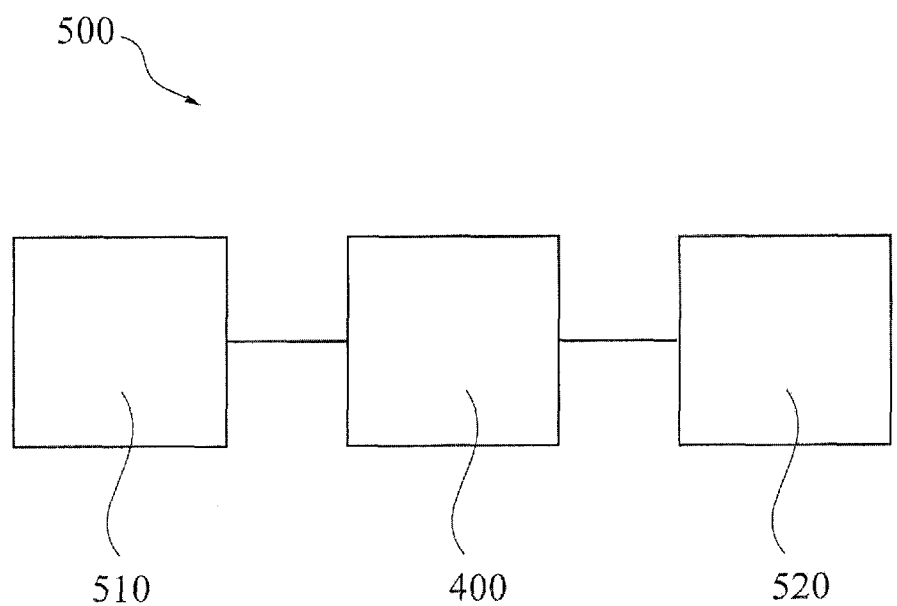
FIG. 5 shows a diagrammatic view of a fill-level measuring device according to an exemplary embodiment of the present invention.

FIG. 5 shows a diagrammatic view of a fill-level measuring device 500 according to an exemplary embodiment of the invention.

The fill-level measuring device 500 comprises a control unit 510, a coupling 400 as described above and below, and a measuring unit 520.

The control unit 510 can be designed to supply energy to the coupling 400, and can comprise an evaluation circuit and control circuit.

The measuring device 520 can be any sensor, for example a sensor suitable for time domain reflectometry.

Figure 6:
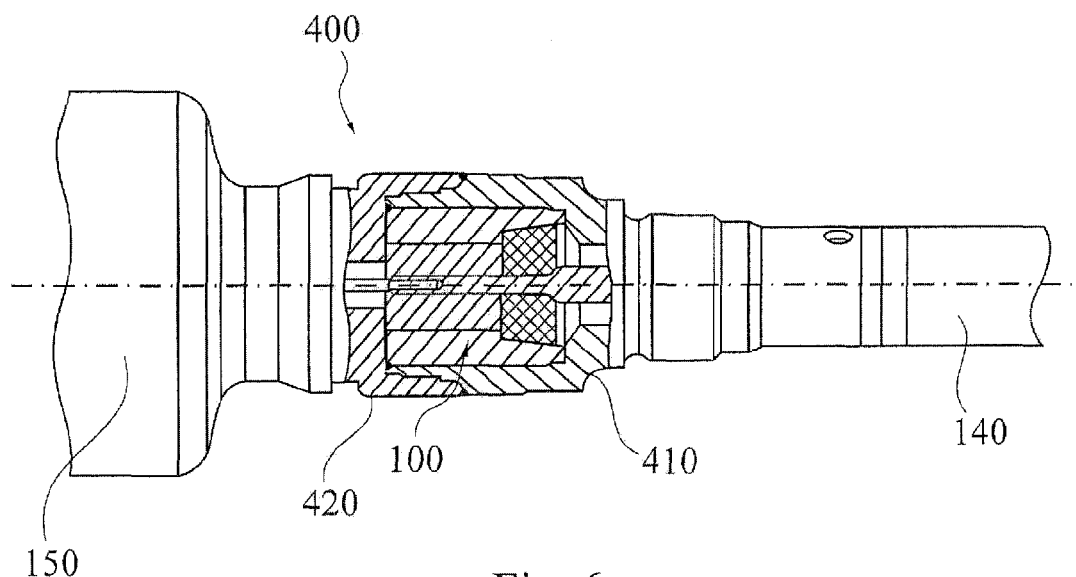
FIG. 6 shows a coupling according to a further exemplary embodiment of the present invention.

FIG. 6 shows a coupling 400 according to a further exemplary embodiment of the invention.

On the process side 140, the coupling 400 is connected to a coaxial sensor by way of the process connection 410.

On the control side 150, the coupling 400 is connected to a control unit (not shown) by way of the control connection 420.

The coaxial sensor functions according to the principle of time domain reflectometry and is suitable, for example, to measure the oil level in a container. The inner conductor and the outer conductor of the coaxial sensor are guided by way of the coupling 400, in particular by way of the process separation device 100, and are transmitted to the control unit.

Figure 7:
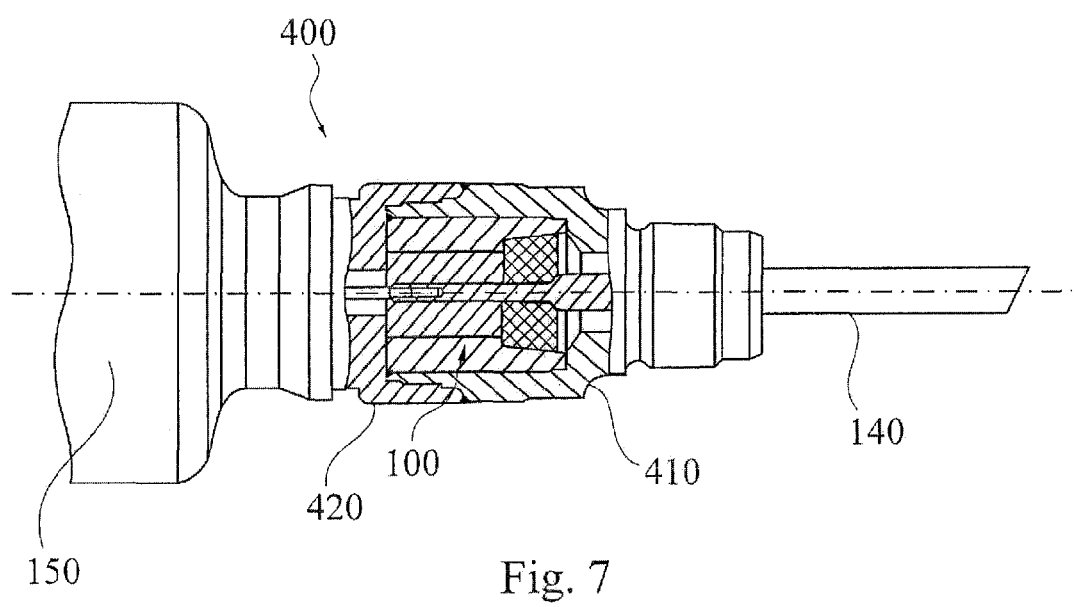
FIG. 7 shows a coupling according to a further exemplary embodiment of the present invention.

FIG. 7 shows a coupling 400 according to a further exemplary embodiment of the invention.

On the process side 140 a rod probe is connected to the process connection 410 of the coupling 400. The rod probe is guided as the inner conductor through the coupling 400, and the process separation device 100 is guided to a control unit which is connected on the process side 150 by way of the process connection 420.

In this exemplary embodiment the outer conductor, which is necessary for measuring, is represented by the process connection 410, which is, for example, connected to an electrically conducting container, wherein the container also acts as the outer conductor.

FIG. 6 and FIG. 7 show the modular design of the coupling 400. The illustrations show the same process separation device 100, in each case with a process connection 410 to which a coaxial probe or a rod probe is connected.

Apart from this, other probes, for example cable probes or multi-rod probes, may also be connected to the process connection.

The process connection can, for example by means of a thread or further suitable connecting mechanisms, be connected to the process separation device. This connection can be designed by bonding the thread or by welding the components, including in a non-detachable manner.

The process connection can, for example, be connected to the container by means of a screw thread, a flange, or further suitable connecting mechanisms.

Especially in the foodstuffs industry there are various customary container connections; for example in that industry the measuring devices are attached by means of a screw-type dairy coupling or a clamping connection.

Corresponding to the various process connections, different control connections 420 can be used. Depending on the temperature of the container or the medium, these control connections can, for example, be designed with different lengths so as to prevent thermal overload of the control unit.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A process separation device for a fill-level measuring device comprising a pressure resistant feed-through for an inner conductor, comprising:
   an inner conductor;
   an outer conductor;
   a process side;
   a control side;
   a feed-through;
   wherein a longitudinal axis of the process separation device extends from the process side to the control side;
   wherein the inner conductor comprises a first conical region, and/or the outer conductor comprises a second conical region;
   wherein the first conical region and the second conical region taper off in a direction along the longitudinal axis of the process separation device;
   wherein the feed-through comprises the first conical region and/or is encompassed by the second conical region in order to, in this manner, establish a connection having positive fit between the inner conductor and the outer conductor;
   wherein the outer conductor comprises a cylindrical region in a direction along the longitudinal axis of the process separation device adjoins the second conical region;
   wherein the cylindrical region comprises a smaller internal diameter than the second conical region;
   wherein a face area of the cylindrical region establishes a connection having positive fit with the feed-through so that movement of the feed-through in a direction along the longitudinal axis of the process separation device from the process side to the control side is prevented;
   further comprising a filler placed in a space delimited by the inner conductor, the outer conductor and the feed-through; and
   wherein the filler compensates for a change in the characteristic electrical impedance of the process separation device as a result of the smaller internal diameter of the cylindrical region when compared to the internal diameter of the second conical region in such a manner that the characteristic impedance of the process separation device does not significantly change along the longitudinal axis.

2. The process separation device according to claim 1, wherein an angle of taper $\alpha$ of the first conical region is smaller than an angle of taper $\beta$ of the second conical region.

3. The process separation device according to claim 2, wherein the angle of taper $\alpha$ is 1°, and the angle of taper $\beta$ is 3°.

4. The process separation device according to claim 1, wherein the filler comprises a smaller dielectric constant than the dielectric constant of the feed-through.

5. A coupling for a fill-level measuring device for coupling a process side of the fill-level measuring device to a control side of the fill-level measuring device, comprising:
   a process separation device according to claim 1;
   a process connection;
   a control connection.

6. The coupling according to claim 5, wherein the process separation device is connected in a modular manner with the process connection and the control connection.

7. A fill-level measuring device with a coupling according to claim 5.

8. The fill-level measuring device according to claim 7, wherein the fill-level measuring device is a time domain reflectometry (TDR) measuring device.

9. The fill-level measuring device according to claim 7, wherein the fill-level measuring device is a fill level radar.

* * * * *